United States Patent
Roy (10) Patent No.: US 9,910,416 B2
(45) Date of Patent: Mar. 6, 2018

(54) SYSTEMS AND METHODS FOR IMPLEMENTING AUTOMATED CONFIRMATION OF COMPLETION OF REPAIR SERVICES ON ENVIRONMENTAL CONTROL SYSTEMS IN MONITORED BUILDINGS

(71) Applicant: Lars Energy Analytics, LLC, Severna Park, MD (US)

(72) Inventor: Randel E. Roy, Severna Park, MD (US)

(73) Assignee: LARS ENERGY LLC, Severna Park, MD (US)

(*) Notice: Subject to any disclaimer, the term of this patent is extended or adjusted under 35 U.S.C. 154(b) by 202 days.

(21) Appl. No.: 14/723,452

(22) Filed: May 27, 2015

(65) Prior Publication Data
US 2015/0261229 A1    Sep. 17, 2015

Related U.S. Application Data

(63) Continuation-in-part of application No. 14/201,774, filed on Mar. 7, 2014, now abandoned.

(60) Provisional application No. 62/003,724, filed on May 28, 2014.

(51) Int. Cl.
*G05B 15/02* (2006.01)
*G05D 23/19* (2006.01)

(52) U.S. Cl.
CPC ......... *G05B 15/02* (2013.01); *G05D 23/1917* (2013.01)

(58) Field of Classification Search
None
See application file for complete search history.

(56) References Cited

U.S. PATENT DOCUMENTS

| | | | | |
|---|---|---|---|---|
| 5,073,862 A | * | 12/1991 | Carlson | F25B 49/005 324/511 |
| 6,385,510 B1 | * | 5/2002 | Hoog | F24F 11/0086 379/102.05 |
| 6,608,560 B2 | * | 8/2003 | Abrams | G08B 1/08 340/539.11 |
| 7,784,291 B2 | | 8/2010 | Butler et al. | |

(Continued)

*Primary Examiner* — Ronald Hartman, Jr.
(74) *Attorney, Agent, or Firm* — TannerIP PLLC; Daniel A. Tanner, III; James E. Golladay, II (57) ABSTRACT

A system and method are provided for implementing an automated scheme for consistently confirming completion of repair and post-repair operating parameters for a heating, ventilation and air conditioning (HVAC) system to improve consistency of diagnostic analyzes, services provided by available or pre-selected HVAC repair facilities or contractors and confirmation of repair services performed by those HVAC repair facilities or contractors. A system-based automated solution is provided for confirmation of completion and efficacy of repairs in HVAC systems. HVAC system and component operations are confirmed to be within specified ranges. System operations are quantitatively assessed in real time and in comparison with an earlier assessment that caused the system repairs to be effected and with available historical data regarding system performance to determine whether the repairs (1) were successfully completed in the manner required, and/or (2) otherwise induced some additional anomalies or difficulties in the HVAC system that should be addressed.

15 Claims, 3 Drawing Sheets

(56) References Cited

U.S. PATENT DOCUMENTS

| | | |
|---|---|---|
| 8,229,597 B2 | 7/2012 | Burton |
| 8,527,098 B2 | 9/2013 | Burton |
| 8,600,559 B2 | 12/2013 | Grohman et al. |
| 8,826,165 B2* | 9/2014 | Harrod ................. F24F 11/0086 700/17 |
| 9,633,401 B2* | 4/2017 | Curtis .................... G06Q 50/06 |
| 2002/0082746 A1* | 6/2002 | Schubring ............ G05B 19/128 700/275 |
| 2002/0180590 A1* | 12/2002 | Abrams ................... G08B 1/08 340/286.06 |
| 2007/0205296 A1 | 9/2007 | Bell et al. |
| 2010/0044449 A1* | 2/2010 | Tessier ................. F24F 11/0086 236/94 |
| 2012/0054124 A1 | 3/2012 | Rodrigues |
| 2012/0072029 A1* | 3/2012 | Persaud ................... G06N 5/04 700/276 |
| 2012/0166051 A1* | 6/2012 | Swartling ............. B60W 30/19 701/51 |
| 2012/0222439 A1 | 9/2012 | Pena |
| 2012/0245968 A1 | 9/2012 | Beaulieu et al. |
| 2013/0339080 A1 | 12/2013 | Beaulieu et al. |
| 2014/0074730 A1* | 3/2014 | Arensmeier ......... F24F 11/0086 705/305 |
| 2014/0365017 A1* | 12/2014 | Hanna ................... F24F 11/001 700/276 |
| 2015/0127165 A1* | 5/2015 | Quam ................. F24F 11/0086 700/275 |

* cited by examiner

SYSTEMS AND METHODS FOR IMPLEMENTING AUTOMATED CONFIRMATION OF COMPLETION OF REPAIR SERVICES ON ENVIRONMENTAL CONTROL SYSTEMS IN MONITORED BUILDINGS

This application is a Continuation-in-Part of U.S. patent application Ser. No. 14/201,774, entitled "Systems and Methods for Implementing Environmental Condition Control, Monitoring and Adjustment in Enclosed Spaces" by Randel E. Roy filed on Mar. 7, 2014. This application is related to Ser. No. 14/723,438 entitled "Systems And Methods for Implementing Automated Intelligence-Based Bidding for Repair Services for Environmental Control Systems in Monitored Buildings" by Randel E. Roy, filed on a same day as this application. This application claims priority to U.S. Provisional Patent Application No. 62/003,724 entitled "HVAC repair confirmation system," by Randel E. Roy, filed on May 28, 2014. The disclosures of the parent, related and priority applications are hereby incorporated by reference herein in their entirety.

BACKGROUND

1. Field of Disclosed Subject Matter

This disclosure relates to systems and methods for implementing an automated scheme for consistently confirming completion of repair and post-repair operating parameters for a heating, ventilation and air conditioning (HVAC) system to improve consistency of diagnostic analyses, services provided by available or pre-selected HVAC repair facilities or contractors and confirmation of repair services performed by those HVAC repair facilities or contractors.

2. Related Art

Environmental conditions in modern commercial and residential buildings are typically controlled to support occupant comfort, or to otherwise support provision of some specialized localized environment. Such specialized purposes can include cold rooms for refrigeration of various products, hot houses for indoor crop production, vacuum systems for maintenance of clean rooms, and/or critical control of the temperatures and/or humidity to support cooling of electronics components in, for example, large data centers. Environmental condition control is undertaken with many different and varying forms of electro-mechanical systems typically comprised of the following major components: compressor, condenser and condenser fan, closed piping loop with refrigerant and an air handling motor and fan (hereinafter referred to as an HVAC system). Such HVAC systems are known to typically reduce temperature and humidity within the involved buildings when outside air temperature and humidity are higher than the temperature and humidity conditions to be maintained within the buildings. Conversely, the HVAC systems are also known to typically increase temperature, while controlling humidity, within the involved buildings when outside air temperatures are lower than the temperature conditions to be maintained within the buildings. Except in the case of the certain specialized environmental conditions mentioned briefly above, occupant comfort is generally the benchmark for adjustment of the environmental conditions within a building, or in at least particular portions of the building. Depending on a size and purpose of the building overall, the environmental conditions may be adjusted to be consistent throughout the entire building, or the environmental conditions may be otherwise individually adjusted within one or more segregated portions of the building.

HVAC systems are often appropriately sized, or particularized, to provide appropriate environmental condition control within a building based on a number of factors regarding the building. These factors may include determining a specific size of a space within a building, or of the building overall, to be heated/cooled, as well as assessing typical outdoor environmental conditions in a location or region in which the building is located (often accounting for reasonable excursions beyond those typical conditions as may suit the owners, operators and/or occupants of the building). Certain assumptions and presumptions regarding (1) HVAC system operations and operating efficiency and (2) environmental integrity of the building also factor into decisions regarding a correct size of an HVAC system to be used for environmental condition control in the building.

The HVAC system, as configured and installed according to the above considerations, then operates under a variety of outdoor environmental conditions to attempt to correctly maintain the desired environmental conditions within the building. Rarely, however, will a particularly-configured HVAC system, as installed in or on a building, operate at peak efficiency in relevant external environmental conditions, for a variety of reasons, including among others system degradation, improper installation, improper operation, electrical/mechanical failure, failure of the control system, or system design. As such, there may typically arise a need or desire to make some modification to the HVAC equipment or its controls to improve the comfort of the building and its occupants.

HVAC systems, particularly those supporting environmental control in large commercial buildings, which, in turn, support many and widely varied businesses, can be very complex in their configurations. These HVAC systems often consist of multiple modularized components, each module, in turn, comprising significant numbers of moving parts. Mechanical system components and moving parts are often subjected to wear during operation that may cause them to operate with decreasing efficiency over time as parts wear and may ultimately wear out. Separately, mechanical system components may randomly fail in operation at any time. In some HVAC systems, certain of the modules also include one or more pressurized closed-loop sub-systems that generally contain some form of working fluid or "refrigerant." A phase of the working fluid is changed from a liquid to a gas and back to a liquid repeatedly to effect the transfer of heat from the inside of the building to the outside of the building. These coolant loops are appropriately sized according to the above, and related, factors. Pressurized sub-systems may develop leaks that can result in reduction of the heat transfer fluid within the pressurized sub-systems causing them to operate less efficiently as fluid levels are depleted to less than optimum. Over-supply, or under-supply, of working fluid, can cause the HVAC system to operate less efficiently. A loss in working fluid from those sub-systems may lead to premature failure of the overall HVAC system, or of specified components within the HVAC system, 0 as well. Deterioration in conditions in either of these scenarios may occur without knowledge of the owners, operators or occupants of the building being serviced by the HVAC system prior to ultimate system failure. The insidious nature of undetected degradations in HVAC system performance may lead to increasing inefficiencies adversely affecting system output causing even more random adjustments to the operation of the system thereby compounding the inefficiencies.

These above-described inefficiencies can be costly when "forcing" a building's HVAC system to operate to properly control the environmental conditions while operating in a degraded mechanical condition.

SUMMARY OF THE DISCLOSED EMBODIMENTS

As is clear from the above discussion, performance and efficiency of the HVAC systems controlling environmental conditions within buildings is highly dependent on those systems being properly maintained and managed. Despite the importance of operating a well-maintained system to maximize efficiency, in many commercial and residential buildings today, it is unlikely that the owners, operators or occupants of the buildings may pay requisite attention to the performance and the efficiency of the HVAC systems. This behavior may arise from a lack of understanding regarding the overall effect that inefficiencies in the operation of the HVAC systems may have on, for example, energy requirements to support environmental condition control within the building. Otherwise, the behavior may arise from an expectation that, absent some ultimate failure of the HVAC system to produce any, or any correct, output, the HVAC system is presumed to be operating "correctly." It is often the case that the first indication of some "deterioration" in a condition of an installed HVAC system arises when that system fails altogether. Fortunately for most common users, modern HVAC system installations include certain safeguard features that will shut the system down in response to certain detected faults in internal operating conditions for the HVAC system or system components. Such safeguards are generally intended to preclude catastrophic or cascading failure within the HVAC system that may otherwise require complete replacement of the system or significant modules within the system. In the operating space between 100% efficient operations of HVAC systems and catastrophic failure, many, if not most, HVAC systems operate at less than optimal efficiency based on improper levels of working fluids being present, overall inadequate maintenance, or other difficulties, including leaks in installed ductwork that may develop over time.

An improperly-maintained HVAC system can easily require 50% more energy to operate the system than would be required for the operation of a properly maintained system. Operating costs for all manner of businesses continue to increase. Principal among such operating costs are the costs associated with the myriad power requirements that are deemed necessary to support business operations. Power consumption, and the costs associated therewith, for environmental condition control may represent an inappropriately large percentage of the total energy costs of a building, particularly when adversely affected by the compounding inefficiencies in the performance of the environmental condition control systems, including the HVAC systems, described above.

Compounding difficulties arising from inefficiencies in HVAC system operation, building owners, operators and/or occupants are generally unaware of how energy is consumed, and particularly the energy directed toward controlling the environmental conditions within their buildings and operating environments. In fact, there are presently no business metrics that may point to potential difficulties based on structural (envelope) inefficiencies within the buildings. Additionally, there are presently no business metrics that, when faced with a subjectively-determined level of difficulty, may identify potential solutions to those determined difficulties that may aid in reducing overall energy consumption for the installed HVAC systems while maintaining a comfortable environmental condition in the building.

In view of the above shortfalls in currently-available monitoring, assessment and analysis tools for building owners, operators and/or occupants, U.S. patent application Ser. No. 14/201,774 (the 774 application), entitled "Systems and Methods for Implementing Environmental Condition Control, Monitoring and Adjustment in Enclosed Spaces" by Randel E. Roy filed on Mar. 7, 2014 introduces a system, system components, and a scheme that may provide business and operational intelligence to building owners or operators regarding energy use by environmental condition or climate control systems. The 774 application describes integrated monitoring, analysis, adjustment and/or control of: (1) operation of the environmental condition control systems; (2) operating efficiency factors associated with the environmental condition control systems; (3) operating efficiency factors associated with support components, including ducting, supporting the environmental condition control systems; and/or (4) operating efficiency factors associated with the operating envelope of the buildings within which the environmental condition control systems are operated, including envelope inefficiencies, HVAC operating inefficiencies, and airflow inefficiencies, among others.

Once the above described HVAC system monitoring and analysis is undertaken/completed, the owners or operators of the "monitored" buildings may be provided with an analysis of system difficulties that they may use to generally then seek outside assistance in addressing. Current HVAC system shortfalls may be highlighted in a report that takes the form of preliminary HVAC system diagnoses (pre-diagnosis) provided to the owners and operators of the "monitored" building.

Those of skill in the art recognize that there are differing numbers of individual HVAC system repair contractors in any particular area (proximate to the "monitored" building) that may have the capacity and/or expertise to address the HVAC system shortfalls determined in the analysis and reported in the pre-diagnosis. There will be circumstances in which the building owner or operator will find it advantageous to determine among those individual contractors which one or more of the "acceptable" contractors may be able to address the system difficulties in a most cost-effective and timely manner, understanding that certain repair tasks may be addressable "in-house."

Once the particular HVAC system repair contractor is selected and contracted, that repair contractor effects the repairs. An effect of the repair may be immediately perceptible in a change in the environmental conditions within the monitored building. A difficulty with such perceptions is that they may not, of themselves, confirm completion of detailed and complex repair actions. It is often difficult for the building owner or operator to know if the repair was completed satisfactorily, or if the repair, for example, may have led to certain other problems, which could be damaging to the equipment, reducing the life of the equipment, or creating incrementally-increasing operational costs. In short; the immediate and/or current comfort level in the building post repair may be sufficient to keep the occupants from complaining, but the HVAC system may still not be operating properly, most efficiently or otherwise in accordance with intended design parameters.

In addition, even if the repair performed by an HVAC service technician appears to have fixed the problem, operational difficulties with the HVAC system can sometimes be intermittent and therefore problems are often fleeting. These problems may appear for some short periods of time, causing uncomfortable conditions that require a service technician for repair, then dissipate once the service technician shows up, only to reappear after the service technician leaves.

It would be advantageous to provide to a particular building owner or operator an automated post repair analysis of building environmental conditions and operating conditions of the building HVAC system and the individual operating components of the system.

Exemplary embodiments of the systems and methods according to this disclosure may implement a system-based automated solution for confirmation of completion and efficacy of repairs in HVAC systems.

Exemplary embodiments may provide a system based analysis of post-repair operations of an HVAC system to confirm system and system component operations are within specified ranges.

Exemplary embodiments may provide an automated platform and/or scheme by which a repaired system performance is evaluated against a system pre-diagnosis upon which repair services were based, the system pre-diagnosis having been forwarded to a plurality of HVAC service repair facilities or contractors as part of a bid solicitation process for the repairs.

Exemplary embodiments may advantageously quantitatively assess a number of operating parameters for the HVAC system in real time and compare the real-time post-repair assessment with an earlier assessment caused the system repairs to be effected and with available historical data regarding system performance to determine whether the repairs (1) were successfully completed in the manner required, and/or (2) otherwise induced some additional anomalies or difficulties in the HVAC system that should be addressed, for example, before cascading or catastrophic failure of one or more system components occurs.

Exemplary embodiments may provide an HVAC system prognostic health evaluation.

Exemplary embodiments may provide an opportunity for building owners and operators to interpret repair results prior to ultimately paying for incomplete or ineffective repair results.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing an automated scheme for consistently confirming completion of repair and post-repair operating parameters for an HVAC system to improve consistency of diagnostic analyses, services provided by available or pre-selected HVAC repair facilities or contractors and confirmation of repair services performed by those HVAC repair facilities or contractors, will be described, in detail, with reference to the following drawings, in which.

DETAILED DESCRIPTION OF THE DISCLOSED EMBODIMENTS

The systems and methods for implementing an automated scheme for consistently confirming completion of repair and post-repair operating parameters for an HVAC system to improve consistency of diagnostic analyses, services provided by available or pre-selected HVAC repair facilities or contractors and confirmation of repair services performed by those HVAC repair facilities or contractors according to this disclosure will generally refer to this specific utility or function for those systems and methods. Exemplary embodiments will be described and depicted in this disclosure as being particularly adaptable to implementing a methodology that is intended to ease a burden on a building owner or operator in confirming completion of repairs in installed HVAC systems. The disclosed systems, methods, and/or schemes should not be interpreted as being specifically limited to any particular configuration of an environmental condition control device or system, an electro-mechanical air handling device or system, and/or an HVAC device or system. Additionally, exemplary embodiments of the disclosed systems, methods and/or schemes should not be interpreted as being specifically directed to any particular intended use, including any particularly limited environmental condition control or occupant comfort control. For example, the disclosed systems, methods and/or schemes may be applicable to control of environmental conditions in a space that is configured as a refrigerated space, as a greenhouse-type space, as a "clean room" workspace, as a temperature/humidity controlled data center space, or any other structure, portion of a structure, or space with a structure that may have particular temperature and humidity control requirements beyond those requirements typically imposed for occupant comfort. In other words, any advantageous combination of the disclosed features and/or schemes that may be effectively employed to provide building owners and/or operators an opportunity to quantitatively evaluate, using a system-based automated platform, an efficacy of a completed HVAC repair service for a particular climate-controlled building or enclosed space is contemplated as being encompassed by this disclosure.

Specific reference to, for example, various configurations of environmental condition control devices or systems, electro-mechanical air handling devices or systems and/or HVAC devices or systems as those concepts and related terms are captured and used throughout this disclosure, should not be considered as limiting those concepts or terms to any particular configuration of the respective devices, overall systems or individually-described system components or elements. The subject matter of this disclosure is intended to broadly encompass systems, devices, schemes and elements that may involve environmental condition control, climate control and the like as those functions may be familiar to those of skill in the art of environmental condition or climate control.

Conventionally, operating conditions of an HVAC system associated with a particular building may only have been evaluated under one of two conditions: (1) when the HVAC system shuts down based on failure of one or more components, or based on a system-detected fault in one or more components; or (2) when a particular, all-too-infrequent, routine maintenance interval expires, e.g., once every three to six months as part of a maintenance program initiated by the building owner or operator. In such instances, an HVAC service/repair technician may be specifically requested to evaluate a "health" of the HVAC system. This "health" monitoring or assessment may include the service/repair technician taking measurements of system parameters at critical points throughout the HVAC system, and in the enclosed space or building serviced by the HVAC system. While the service/repair technician may write down the results of the evaluation as, for example, test results, the test results may be used for nothing more than for the service/repair technician to make particular adjustments or replace particular HVAC system components. The test results may then be re-evaluated by the service/repair technician, according to his or her expertise, to determine (in a subjective manner) whether the actions that the service/repair technician undertook restored the HVAC system closer to its standard operating parameters. Typically, the test results are not collected or correlated, or recorded in a database for any type of historical tracking of the maintenance condition, operating state, or operating efficiency of the HVAC system in that building and certainly no correlation is undertaken with regard to the operation of like HVAC systems in other buildings. In fact, service/repair technician on-the-spot test results are typically discarded so as to be lost the moment the service/repair technician leaves the building having completed servicing and/or minor repair of the HVAC system.

Even as systems and methods may have been introduced to more routinely track the maintenance condition, operating state or operating efficiency of the HVAC system, there has remained no consistent means of measuring the static and dynamic efficiency of the building envelope itself. Moreover, duct efficiency, as a separate and distinct operating effectiveness parameter, is rarely, if ever, considered as part of the evaluation of the HVAC system by the HVAC system service/repair technician. In short, there exists no currently-implemented combination of related and interactive monitoring devices coupled to analytical software that may calculate HVAC efficiency, building envelope efficiency and duct efficiency in real time, particularly in a manner that allows for an analysis of the interaction between these efficiency components to provide business and operational intelligence to building owners or operators regarding energy use by environmental condition or climate control systems within the building. The systems and methods described in the 774 application address these shortfalls.

An objective of the systems and methods disclosed in the 774 application is to provide this business and operational intelligence to building owners, operators or other stakeholders regarding energy use by environmental condition or climate control systems within the building. It is intended that those systems and methods may provide these individual users or user entities with better, and more consistent, knowledge regarding how well the HVAC systems in a particular building are operating, insight into energy losses attributable to inefficiencies in the duct systems, and an analytical assessment of how much energy is being lost to the building envelope. The building owners or operators may also be afforded a capacity to compare all of these measurements for one building to all of these measurements for other similar buildings, whether these buildings are co-owned or owned by others. With such an analytical assessment of an overall HVAC system efficiency, it is anticipated that building owners and/or operators may institute processes that will result in reduced maintenance expenses and prolonging of the life cycles of the HVAC systems overall. An advantage of such systems and methods is that the monitoring and analysis of the HVAC system operations and operational efficiencies is advantageously supplemented with coincident monitoring and analysis of other related factors that impact an overall environmental condition or climate control scheme for a particular building. Put another way, an advantage of those schemes and techniques is provided in the reliance on collected data regarding the efficiency of the ducts and the efficiency of the building envelope, collected in real time, and analyzed to the benefit of the building owner or operator as a supplement to information regarding operations, and operational efficiencies, of the HVAC system alone.

Most building owners, operators and occupants are not skilled in the art of repairing the HVAC equipment, are not licensed to handle the dangerous materials potentially involved in making the repair and are not qualified to evaluate the completion of the repair services other than through a temporary "feel" that the environmental conditions in a building or space are restored to acceptable parameters. It is difficult for the building owner or operator to know if the repair was completed satisfactorily, or if the repair may have led to some other problem which could be damaging to the HVAC system or equipment, reducing the life of the HVAC system or equipment, or creating incrementally increasing operational costs. In the short term, the comfort level in the building may be sufficient to keep the occupants from complaining, but the HVAC system may still not be working properly, or in accordance with intended design parameters, either of which may lead to insidious, cascading or catastrophic failures that are unforeseen without a detailed post-repair system analysis. Even if the repairs performed by an HVAC service repair technician appear to have fixed the current difficulties or anomalies, operational and/or system component difficulties within the HVAC system may sometimes be intermittent and therefore problems are often fleeting. These fleeting problems may, for example, appear for some short period of time, cause uncomfortable conditions that require a service repair technician for repair, then dissipate once the service repair technician shows up, only to reappear after the service repair technician leaves.

The service repair technician may evaluate the health of the system by taking measurements of the pressure of the refrigerant in the closed loop system plus the temperature differential created by the HVAC system in the building. The service repair technician may employ his or her knowledge of the equipment to determine what action to take. The service repair technician may then make the necessary modifications to the system to fix the equipment. Each service repair technician uses his or her individual knowledge to determine the problem with the HVAC system. While the service repair technician may write down the results of the evaluation, the test result, the repairs made and the operating conditions following the repairs are not recorded in a database and are almost always lost the moment the service repair technician leaves the building.

Because all service technicians are not alike, each one could diagnose each problem differently and may take different action to effect the repairs. Also, there currently is no way to keep track of service repair technician effectiveness and whether or not the repairs implemented by the service repair technician actually addressed, much less fixed, the problem. The disclosed monitoring systems and schemes may accumulate data at various points on an HVAC system and use logic built in to the software to determine (1) a problem with the HVAC system, (2) an action required to address the problem, and (3) an action undertaken to address the problem results in the problem being eliminated, i.e., the system is repaired. By combining real-time data, machine learning and analytical software, the disclosed systems and schemes may provide business intelligence to service technicians and building owners and operators to better identify required services and to confirm that the services executed addressed determined difficulties in the system.

HVAC repair service providers may benefit from improved diagnostics and lower cost to service HVAC equipment. HVAC repair service technicians will experience reduced time on site to perform maintenance and repairs. Building owners and operators may likely benefit because service calls will cost less money and HVAC systems will be repaired more accurately and repairs will only be paid for when the repairs are verified as correcting the difficulties and/or making desired environmental control improvements.

The disclosed systems and methods, referred to as an HVAC repair confirmation system or HVAC RCS, implement a system based scheme for monitoring several aspects of the HVAC system in a building and identifying any operational issues in real-time using software and unique algorithms.

Figure 1:
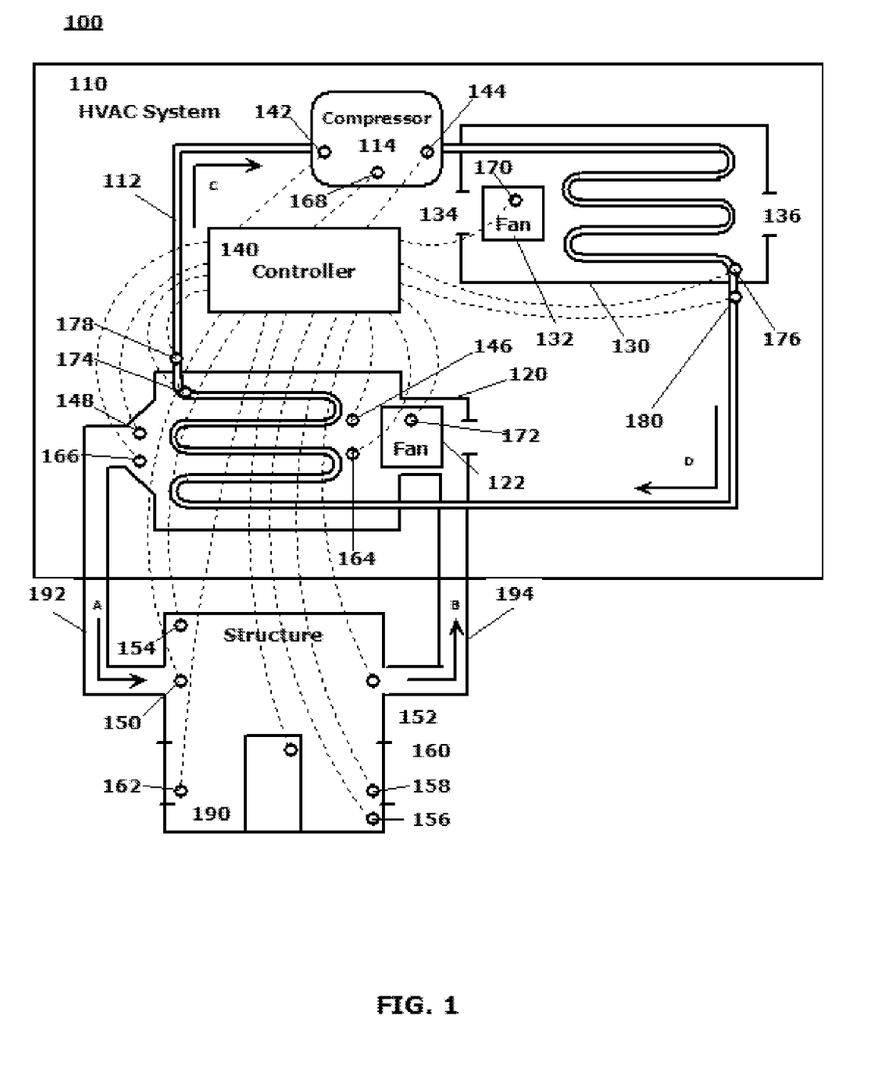
FIG. 1 illustrates a schematic diagram of a configuration for an operating environment within which an exemplary environmental condition control, monitoring, analysis and adjustment system is employed for providing post-repair operation of an HVAC system to confirm a resolution of a difficulty according to this disclosure.

FIG. 1 illustrates a schematic diagram of a configuration for an operating environment 100 within which an exemplary environmental condition control, monitoring, analysis and adjustment system is employed for providing post-repair operation of an HVAC system to confirm a resolution of a difficulty according to this disclosure. As shown in FIG. 1, an exemplary structure 190 may have associated with it a particularly-configured environmental condition control or exemplary HVAC system 110. The particularly-configured exemplary HVAC system 110 may condition a supply of temperature-adjusted and/or humidity-adjusted forced air to be fed to the structure 190 in direction A through one or more supply ducts 192. Return air may then be recovered or evacuated from the structure 190 in direction B through one or more return ducts 194 to be re-conditioned or otherwise processed in the HVAC system 110.

Typical configurations of an exemplary HVAC system 110, such as that shown in FIG. 1, may include one or more pressurized closed-loop piping systems 112 in which a heat transfer fluid or refrigerant may be circulated in the direction indicated by arrows C and D. As is well known in the art, the heat transfer fluid is directed to an inlet side of a compressor 114. The compressor 114 compresses relatively cooler, low-pressure heat transfer fluid (in a vapor phase) and pumps out higher-pressure hot heat transfer fluid. The compressor 114 may be a motor driven device that facilitates the flow of the heat transfer fluid through the one or more pressurized closed-loop piping systems 112 by drawing the low-pressure, low-temperature heat transfer fluid from an evaporator section 120 and outputting the high-pressure, higher temperature heat transfer fluid, compressed in the compressor 114, to a condenser section 130.

The one or more pressurized closed loop piping systems 112 may follow a serpentine path (as shown) in the condenser section 130. An object of the condenser section 130 is to function to release enough heat to the outside air to cool the heat transfer fluid from a hot gas vapor state to a less-hot liquid state. This is generally accomplished by activating a condenser fan 132 to take air from an inlet 134 opening, force that air across the one or more closed loop piping systems 112 in whatever configuration the piping may be presented in the condenser section 130, and to exhaust that air out of the condenser section 130 via, for example, an outlet 136.

The heat transfer fluid exiting the condenser section 130 in a liquid phase then continues to the evaporator section 120. The evaporator section 120 acts as a heat exchanger that exchanges heat from the return air recovered from the structure 190 via the one or more return ducts 194 with the liquid phase heat transfer fluid being carried through the evaporator section 120 by the one or more closed-loop piping systems 112, again possibly in a serpentine configuration as shown in FIG. 1. With the assistance of an evaporator fan 122 provided in the evaporator section 120, the return air from the structure 190 is forced through the evaporator section 120 across the one or more closed loop piping systems 112 circulating the heat transfer fluid. The heat transfer fluid absorbs the heat that is transferred from the air passing over the piping in the evaporator section 120. The supply air is forced back into the structure 190 via the one or more supply ducts 192 in direction A.

Those of skill in the art will recognize that the above description represents a very basic description of an operation of an exemplary HVAC system 110 such as that shown in FIG. 1, and that wide variations in included components, functions of those components, and overall system configurations may be undertaken.

The disclosed systems and methods add to the typical HVAC system 110 supporting environmental condition control in a structure 190 by providing a controller 140 in communication with a plurality of individual sensors provided in the HVAC system 110 itself, the inlet/outlet ducts 192,194 and throughout the structure 190.

The controller 140 may be particularly configured to receive signals from a plurality of temperature sensors. These temperature sensors may include, for example, a compressor inlet fluid temperature sensor 142, an evaporator outlet fluid temperature sensor 174, a condenser-outlet fluid temperature sensor 176, a compressor outlet fluid temperature sensor 144, a pre-evaporator return air temperature sensor 146, a post-evaporator supply air temperature sensor 148, a structure supply air temperature sensor 150, a structure return air temperature sensor 152, a structural environment warm air sensor 154, a structural environment cool air sensor 156, and one or more temperature sensors 158,160, 162 that may be associated with one or more environmental openings from the structure to the outside environment.

The controller 140 may be further particularly configured to receive signals from a plurality of humidity sensors including, but not limited to, a pre-evaporator humidity sensor 164 and a post-evaporator humidity sensor 166.

The controller 140 may be further particularly configured to receive signals from a plurality of pressure sensors including but not limited to, a post-evaporator fluid pressure sensor 178, and a post-condenser fluid pressure sensor 180.

The compressor inlet fluid temperature sensor 142 may be placed in, or in contact with, the one or more closed loop piping systems 112 on the inlet side of the compressor 114 to take the temperature of the low pressure heat transfer fluid returning to the compressor 114. The compressor outlet fluid temperature sensor 144 may be placed in, or in contact with, the one or more closed loop piping systems 112 on the outlet side of the compressor 114 to sense the temperature of the high pressure heat transfer fluid leaving the compressor 114. The pre-evaporator return air temperature sensor 146 and the pre-evaporator humidity sensor 164 may be placed in the return airstream just prior to the evaporator, and on either side of the evaporator fan 122 in the evaporator section 120 to respectively sense the temperature and humidity of the air returning from the structure 190 via the one or more return ducts 194. The post-evaporator supply air temperature sensor 148 and the post-evaporator humidity sensor 166 may be placed in the supply air airstream just after the evaporator to sense the temperature and humidity of the air after it has been conditioned by the evaporator section 120, but prior to entering the one or more supply ducts 192 that carry the conditioned supply air to the structure 190. The structure supply air temperature sensor 150 may be placed in the supply air airstream at the mouth of the one or more supply ducts 192, for example, just at, or closely in a vicinity of, a point where the conditioned air exits the one or more supply ducts 192 to be introduced into the structure 190. This structure supply air temperature sensor 150 may measure the temperature of the conditioned supply air specifically at the point that the supply air is introduced into the structure 190. The structure return air temperature sensor 152 may be placed at the mouth of the one or more return ducts 194 at, or closely in a vicinity of, a point where the return air leaves the structure 190 on its way to be conditioned by the exemplary HVAC system 110. The structure return air temperature sensor 152 may measure the temperature of the return air at the point that the return air is being drawn into the one or more return ducts 194 exiting the structure 190.

The structural environment warm air sensor 154 may be placed in a comparatively high position within the structure 190 to assess an overall warm air temperature condition within the structure. The structural environment cool air sensor 156 may be placed in a comparatively low position within the structure 190 to assess an overall cool air temperature condition within the structure. Differences in temperatures measured by the structural environment warm air sensor 154 and the structural environment cool air sensor 156 may aid in a further detailed analysis of the environmental condition control within the structure 190. The one or more temperature sensors 158,160,162 that may be associated with one or more environmental openings from the structure 190 to the outside environment may be placed on, or in a vicinity of, respective operable doors and/or windows in the structure 190 to monitor one or more of operation of the respective operable doors and/or windows and to measure temperatures respectively in a vicinity of the operable doors and/or windows in the structure 190.

Additionally, the controller 140 may be particularly configured to receive signals from a plurality of current transducers including, but not limited to, a compressor motor current transducer 168, a condenser fan motor current transducer 170, and an evaporator/air handler fan motor current transducer 172. The compressor motor current transducer 168 may be placed on, or in a vicinity of, the electrical wiring providing electrical power to the compressor 114 to measure the electrical current flowing into the compressor 114 as a measure of the electrical power being expended by the operation of the compressor 114. The condenser fan motor current transducer 170 may be placed on, or in a vicinity of, the electrical wiring providing electrical power to a motor driving the condenser fan 132 to measure the electrical current flowing into the condenser fan 132 as a measure of the electrical power being expended by the operation of the condenser fan 132. Similarly, the evaporator/air handler fan motor current transducer 172 may be placed on, or in a vicinity of, the electrical wiring providing electrical power to a motor driving the evaporator fan 122 to measure the electrical current flowing into the evaporator fan 122 as a measure of the electrical power being expended by the operation of the evaporator fan 122.

All of the above-described temperature, humidity and/or current monitoring sensor components, as listed, may be communicatively connected to the controller 140 via one or more wired or wireless links that may allow the controller 140 to receive a signal from each of the temperature, humidity and/or current monitoring sensors, the controller 140 converting the electrical signals to temperature, humidity and/or amperage readings for each of the temperature, humidity and/or current monitoring sensors. The controller 140 may store the received sensor information in an internal data storage device and/or employ an internal processor to process the received sensor information. Otherwise, the controller 140 may transmit the received sensor information to one or more remote data storage devices to be stored and/or to one or more remote processors to be processed. Communication with any remote data storage device, or any remote processor, may be via wired or wireless means.

External data storage and/or processing capabilities may be undertaken by a dedicated local or remote computer assigned to the data monitoring, collection and analysis functions, or by a non-dedicated local or remote computer, for example, running routine that undertakes the data monitoring, collection and analysis functions along with other processing functions carried out by the non-dedicated local or remote computer.

No particular limitation on a frequency by which sensor data may be received, collected, stored and/or analyzed is implied. In other words, the sensor data may be received by the controller 140 as frequently as once every millisecond, or as infrequently as once every day. Further, it is anticipated that, in embodiments, the sensor data stored on a particular storage device may then be uploaded to a structure database to facilitate sensor data manipulation by the processor and/or to create a historical database for analysis. The disclosed local or remote processor may manipulate the collected sensor data to calculate one or more of the following measures.

An efficiency of the HVAC system itself may be calculated. An engineering-based definition of efficiency is Energy Out/Energy In, or Work Out/Work In. In one or more of the disclosed embodiments, "Energy In" may be defined as a value derived from an electricity consumption measured, for example, in watts, of the compressor motor, the condenser fan motor and the evaporator/air handling fan motor, taken in combination. The "Work Out" may be defined as a value derived from a change in temperature and humidity (enthalpy) across the one or more closed-loop piping systems 112 in the evaporator section 120 (the evaporator coil).

In addition to the overall efficiency calculations described above, there are two additional measures of efficiency that the exemplary system 100 may calculate to assess the potential source of inefficient behavior. First, the system will calculate superheat, which those of skill in the art recognize is the number of degrees a vapor is above its saturation temperature (boiling point) at a particular pressure, typically measured at the outlet of the evaporator. Second, the system will calculate sub-cooling, which those of skill in the art recognize is the number of degrees a liquid refrigerant is colder than the minimum temperature (saturation temperature) required to keep it from boiling and, hence, change from a liquid to a vapor phase, and is often calculated at the exit of the condenser.

An efficiency of the air ducting may be calculated. The air duct system supporting the structure 190, and most specifically, the one or more supply ducts 194 provide a pathway for supply air to be moved from the evaporator section 120 where the supply air is conditioned, to various parts of the structure 190 where occupants may live and/or work. Characteristics of the configuration of any air duct system, including discontinuity in construction of the individual air ducts, may create holes, gaps and other like leakage points in the air duct system. These leakage points, coupled with un-insulated exposure of the air duct system to outside air temperatures, reduce efficiency of the air duct system, i.e., ductwork is never 100% efficient.

The disclosed schemes may calculate the efficiency of the air ducting as a percentage of energy loss in the one or more supply ducts 192 relative the energy created in the evaporator section 120 as a measure of the efficiency of the one or more supply ducts 192. The efficiency of the air ducting calculations may be generally undertaken by collecting temperature data from the following sensors: the pre-evaporator return air temperature sensor 146, the post-evaporator supply air temperature sensor 148, the structure supply air temperature sensor 150 and the structure return air temperature sensor 152.

Overall duct efficiency may be broken into two distinct efficiency measurements. The first measurement is the return duct efficiency and the second is the supply duct efficiency. Combined, the return and supply duct efficiencies provide a view of the efficiency of the entire duct system. The return duct efficiency is calculated based on the temperature loss between the structure return air temperature sensor 152 and the pre-evaporator return air temperature sensor 146. Losses can be measured in degrees, or as a percentage of a total change in temperature (delta T) created by the evaporator section 120. For example, if the temperature measured by the structure return air temperature sensor 152 is 75 degrees and the temperature measured by the pre-evaporator return air temperature sensor is 78 degrees, the duct system is responsible for a loss of three degrees of cooling. Further, if the post-evaporator supply air temperature sensor 148 measures the temperature at 65 degrees, the evaporator section 120 is shown to create 10 degrees of delta T, but 3 degrees of delta T are being lost in the return duct, we would calculate that the return duct losses are equal to a value of 30%.

Supply air losses may be calculated similarly by measuring the difference between a temperature of the supply air measured by the post-evaporator supply air temperature sensor 148 and a temperature of the supply air entering the structure 190 measured by the structure supply air temperature sensor 150. If, in this example, the supply air temperature in the structure 190 as measured by the structure supply air temperature sensor 150 is 70 degrees, 5 degrees of delta T were lost in the one or more supply ducts 192. This would mean that the supply duct system, i.e., the one or more supply ducts 192, is only 50% efficient and the total duct system is only 20% efficient. Stated another way, the entire duct system has 80% losses.

While the above example is based on measuring cooling efficiency, a similar process is used in calculating duct losses when the system is operating in heating mode.

The disclosed schemes may calculate efficiency of the building envelope. Building envelope is made up of all a building's exterior structure that is exposed to outside air temperature and humidity conditions. The walls, windows, and roof make up most of the building's envelope. Conventionally, the environmental condition control industry has used R-values, or U-values to measure how well each of these exposed structural components resist heat transfer and thus assess an ability of each of these exposed structural components to keep the cold in/out and the heat out/in, depending on the external environmental conditions.

The disclosed schemes may calculate how effective the structural components of the building are combined, by calculating energy losses per square foot of exposed building envelope, measured in energy losses per square foot per hour. Because energy losses per square foot per hour vary widely based on the difference between the outside temperature and the target inside temperature, the disclosed schemes may add another dimension to the measurement in the form of degree of delta T across the building envelope. Therefore, the disclosed schemes measure building envelope efficiency in terms of, for example, a BTU loss per square foot per hour per degree of delta T.

To calculate the energy losses per square foot per hour, the disclosed schemes first calculate the actual cooling/heat delivered to the building per hour from the HVAC system. The need for heating/cooling is a function of two things, operations of the building and losses from the building envelope. The operations of the building include heat load added to the building from things like computers, heat given off by the occupants, heat generated from lighting, and heat entering the building from opening the door. These are just a few examples of the heat gained from operations (in this example, it is assumed that the building is being operated in a cooling mode, but a similar analysis can be performed when the building is being operated in a heating mode). Based on a desire to isolate and quantify a building's operational need for heating/cooling from the need for heating and cooling as a function of losses from the building envelope, the disclosed schemes first incorporate methods of isolating these two components.

One way to isolate the two components is to stop all operations of the building and measure the static heat losses/gains when the operations of the building are at a standstill. In some cases, this may be simple as understanding that many commercial building enterprises have effectively ceased all operation at night, nighttime energy requirements are then a function of building envelope static losses only. This methodology works well for restaurants, commercial office buildings and a large number of other commercial buildings that are subjected to routine periods of general inactivity.

There are, however, situations where the above measurements of static heat losses/gains may not be as easily achievable. Take, for example, operations of some commercial buildings like hospitals and hotels that are subject to virtually round-the-clock operations, at least at some level. In these cases, the disclosed schemes may measure the heat load from operations in a building by measuring the electricity consumed in the building at the main meter combined with sub-meters for major subsystem like lighting, or HVAC systems. Heat gain from operational losses is then calculated based on electricity consumption by specifically measurable types (HVAC, lighting, refrigeration, computers, etc.) times a heat loss associated with each category. The sum total of all heat lost from each category is the total operational heat gain of the building which can be subtracted from the total heat gain to get the heat gain from the building envelope.

The disclosed schemes may calculate percent energy consumed when the building is unoccupied. In this regard, the disclosed schemes are usable to calculate how much energy is consumed during occupied and non-occupied hours for a particular building. Again here, these calculations regarding the energy consumed during occupied and non-occupied hours may be made in two ways. The first way is to assume that the operational hours of the business are the occupied hours (for a restaurant and other retail establishment, the occupied hours also includes set-up and clean-up periods before and after the posted business hours open to the public). The second way is to use motion detectors to determine if anyone is still in the building. The processor may then segregate the calculations according to these categories.

Those of skill in the art will recognize that the disclosed schemes are unique in that, to date, those involved in the enclosed space environmental condition and climate control industry evaluate, if anything, only a performance, health and/or efficiency of the HVAC system, generally on an infrequent or on demand basis, e.g., either when they suspect that there is a problem, or during all-too-infrequent routine maintenance. In addition, what, if any, information that is collected is not stored for future use. The disclosed schemes address both of these shortfalls by collecting information from a plurality of sensors on a routine basis that assesses not only a performance, health and/or efficiency of the HVAC system, but also of the ducting and the building envelope as separate and distinct measure of efficiency and storing data for future use, combining it with other data and creating business intelligence that can be used to make environmental condition control decisions and/or identify environmental condition control problems in the building as a whole. Furthermore, the current procedure for collecting this information does not allow the user to calculate duct efficiency, or envelope efficiency, as this calculation requires that data be collected over time, not just at one point in time.

The disclosed schemes are unique in that a new measure of envelope efficiency is employed. In the disclosed schemes a total heat gain or loss in a building may be determined. Total building heat gain or loss has never been measured because building component manufacturers are focused on the heat gain or loss potential from a single component of the building, such as the walls, roof, windows, doors and the like, but not on the overall building as an integrated operating unit.

The disclosed systems and methods are based on an HVAC system with only one compressor, one condenser fan, and one air handling fan. The disclosed systems and methods could be similarly used on any HVAC system with multiple or single compressors, condenser fans or air handling fans. The disclosed systems and methods are based on the HVAC system being installed in a typical "Package" or "Rooftop Unit (RTU)" used in a typical commercial building application. The disclosed systems and methods may also be adapted for use in HVAC systems that are "split" or "mini-split" systems.

The controller 140 and the data collected from the myriad sensors described above may constitute an integrated HVAC monitoring system to support the post-repair analysis of system performance for the HVAC RCS. The HVAC RCS is unique in that, to date, companies in the industry are evaluating the HVAC conditions and efficiency of the HVAC system only on an infrequent basis, either when they suspect there is a problem, or during routine maintenance. In addition, the information that is being collected is not being stored for future use, whereas HVAC RCS may store data for future use, combining it with other data and creating business intelligence that can be used to make decisions, identify problems in HVAC system in one or more monitored buildings and/or to particularly confirm the efficacy of, and restoration of operational efficiency by, completed HVAC system repairs.

In addition, the disclosed schemes update current procedures for collecting this information that (1) do not pre-diagnose problems and (2) do not allow a user to use a hardware/software system to determine if a particularly pre-diagnosed problem is resolved or not as a basis for determining whether the HVAC repair service technician should be paid.

All of the building and HVAC system data may be collected by an HVAC system monitor and stored in a data storage component associated with the HVAC system monitor. Data may be collected and stored as frequently as once every millisecond, or as infrequently as once every day. In embodiments, once repairs are effected, the data may be evaluated to determine if certain key operating parameters are within manufacturer's specification and then evaluated to determine if key operating parameters meet the specifications developed by building owners, building operators, building occupants and/or other entities including system suppliers, system component suppliers and even government regulators. Competing specifications may be used to formulate the analytic algorithms. In the event that the HVAC system key operating parameters are substantially different any of the defined or developed criteria, the HVAC RCS may determine that the completed repairs have proven ineffective in addressing the identified difficulties. The building owners or operators may use the information provided by the HVAC RCS as "proof" that further repair actions are warranted prior to "signing off" on the repairs and authorizing payment for the repair services.

In embodiments, particular sets of algorithms may be additionally employed to monitor sensor health and to determine if additional sensors are providing readings (either combinations of sensors at a single point in time, or single sensors over time, or multiple sensors over time) that would indicate that there could be a problem with the HVAC system or that the system may soon have a problem. With this additional information, the processor may provide advanced diagnostic data as a part of the post repair analysis delivered to the building owner.

Figure 2:
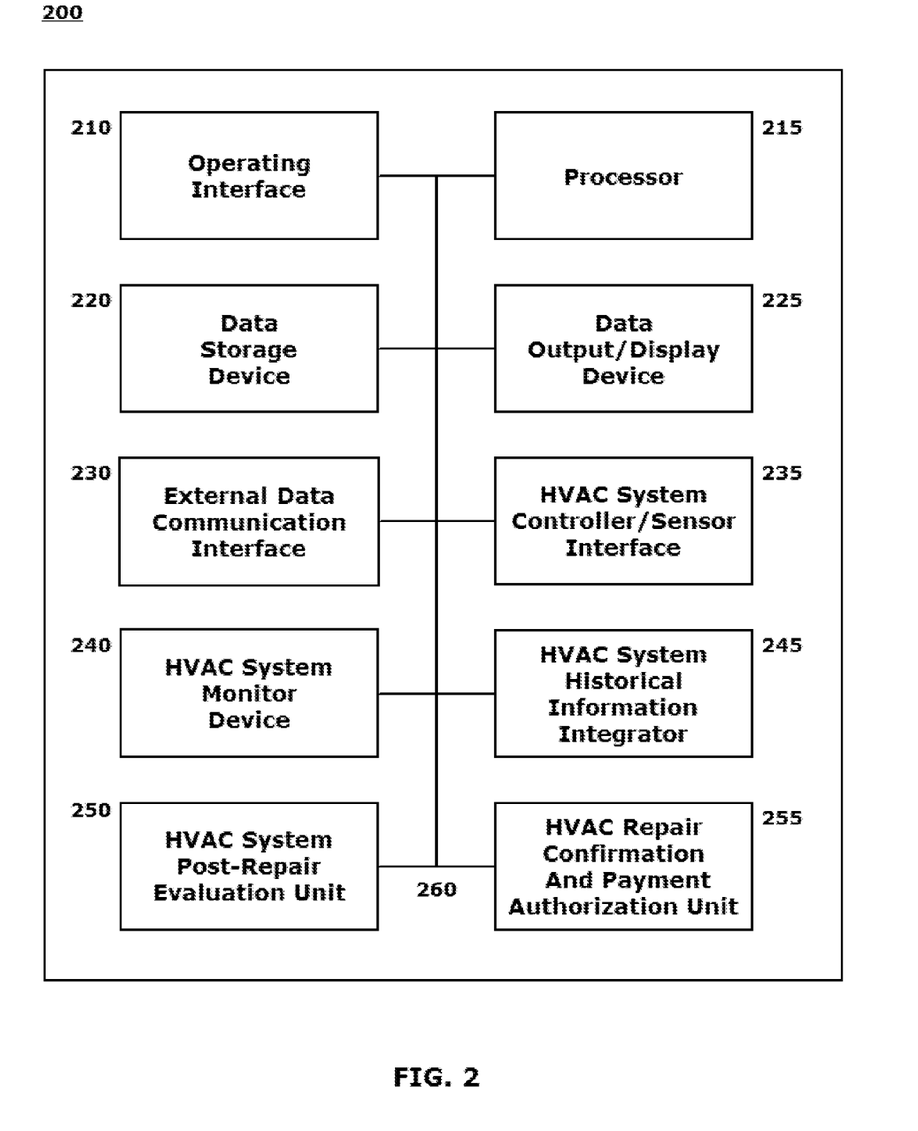
FIG. 2 illustrates a block diagram of an exemplary analysis system for evaluating an efficacy of an HVAC system repair in the building based on a real-time analysis and a comparison to a system pre-diagnosis and any historical data on system operation according to this disclosure.

FIG. 2 illustrates a block diagram of an exemplary analysis system 200 for evaluating an efficacy of an HVAC system repair in the building based on a real-time analysis and a comparison to a system pre-diagnosis and an historical data on system operation according to this disclosure. The exemplary system 200 shown in FIG. 2 may be implemented as a unit integral to an HVAC system, may be located in the monitored building or may be implemented as a separate unit remote from, and in communication with, the HVAC system and or the monitored building.

The exemplary system 200 may include an operating interface 210 by which a user may communicate with the exemplary system 200 for directing at least a mode of operation of the exemplary system 200 and for directing certain functions of the automated repair confirmation scheme for evaluating HVAC system repairs. The operating interface 210 may be a locally accessible user interface associated with the HVAC system, located in the monitored building or located remotely and in communication with the HVAC system. The operating interface 210 may be configured as one or more conventional mechanisms common to control devices and/or computing devices that may permit a user to input information to the exemplary system 200. The operating interface 210 may be a part of a function of a graphical user interface (GUI) mounted on, integral to, or associated with, the HVAC RCS, or it may comprise any user manipulated interface associated with a local or remote computer comprising the exemplary system 200.

The exemplary system 200 may include one or more local processors 215 for individually operating the exemplary system 200. The processor 215 may reference sensor inputs received from a plurality of sensors and communicated to the exemplary system 200 via, for example, an integral or remote HVAC system monitor device 240 to carry out the disclosed analysis of sensor data to result in a system post-repair evaluation/confirmation that an identified HVAC system difficulty has been adequately and correctly addressed. The processor 215 may reference historical HVAC system operating information stored in one or more storage devices 220 to supplement the post-repair analysis and/or a resolved pre-diagnosis of HVAC system difficulties. Processor 215 may include at least one conventional processor or microprocessor that interprets and executes instructions to direct specific functioning of the exemplary system 200 and an associated HVAC RCS that may be usable for evaluating HVAC system repair within the monitored building under the control of the exemplary system 200.

The exemplary system 200 may include one or more data storage devices 220. Such data storage device(s) 220 may be used to store sensor data, calculated and/or analyzed data and/or historical data regarding the operations of the HVAC system within the monitored building, as well as storing operating programs to be used by the exemplary system 200, and specifically the processor 215 in carrying into operation the disclosed functions. Data storage device(s) 220 may store an updatable database of sensor data, calculations and/or analysis results.

The data storage device(s) 220 may include a random access memory (RAM) or another type of dynamic storage device that is capable of storing updatable database information, and for separately storing instructions for execution of system operations by, for example, processor 215. Data storage device(s) 220 may also include a read-only memory (ROM), which may include a conventional ROM device or another type of static storage device that stores static information and instructions for processor(s) 215. Further, the data storage device(s) 220 may be integral to the exemplary system 200, or may be provided external to, and in wired or wireless communication with, the exemplary system 200, including as cloud-based data storage devices.

The exemplary system 200 may include at least one data output/display device 225, which may be configured as one or more conventional mechanisms that output information to a user, including, but not limited to, a display screen on a GUI of an HVAC system, HVAC RCS, or as a stand-alone component connected to, and in communication with, the exemplary system 200. The data output/display device 225 may be used to indicate one or more of (1) collected HVAC sensor data, (2) a generated pre-diagnosis, (3) the generated pre-diagnosis supplemented with historical data germane to the detected difficulty with the HVAC system, and (4) results of a post-repair system-wide automated analysis of the HVAC system, and (5) other like information regarding the disclosed method, process or scheme.

Where appropriate, the exemplary system 200 may include at least one external data communication interface 230 by which the exemplary system 200 may communicate with one or more external components, or resources, including any particular HVAC system repair facilities and/or contractors for conveying information regarding repairs to be conducted and a post-repair analysis.

The exemplary system 200 may include at least one HVAC system controller/sensor interface 235 by which the exemplary system 200 may be communicatively connected with a plurality of temperature, humidity and current sensors located in the HVAC system, HVAC system ductwork, and/or in the monitored building serviced by the HVAC system. The HVAC system controller/sensor interface 235 may communicate with the HVAC system, HVAC system sensors, an HVAC controller, and/or the HVAC monitor device 240 for collecting data by which to generate a report of a post repair evaluation of HVAC system performance once detected difficulties with an HVAC system have been addressed. The communicating connections may be via wired means, wireless means, or a combination of the two.

The exemplary system 200 may include an HVAC system monitor 240, which may be provided as a standalone device or as a portion, and/or as a function, of the processor 215 in communication with the at least one data storage device 220. The HVAC system monitor device 240 is the hub by which all information regarding HVAC system performance may be collected, evaluated, stored and/or transmitted. Sensor data may be received via the HVAC system controller/sensor interface 235. Analytic data may be output via the external data communication interface 230.

The exemplary system 200 may include an HVAC system historical information integrator 245, which may be provided as a standalone device or as a portion, and/or as a function, of the processor 215 in communication with the at least one data storage device 220. The HVAC system historical information integrator 245 may reference stored historical data on the operation of the HVAC system to supplement any post-repair analysis of HVAC system performance. A comparison to pre-repair conditions and operations of the HVAC system may prove extremely helpful in the post-repair evaluation.

The exemplary system 200 may include an HVAC system post-repair evaluation unit 250. The HVAC system post-repair evaluation unit 350 may provide the engine/platform to particularly direct the evaluation of all available sensor data, any system pre-diagnosis and any germane historical operating data for the HVAC system to determine whether (1) the repairs addressed the problems, (2) the repairs restored the operating health of the HVAC systems, and/or (3) the repairs introduced additional difficulties to be addressed in the context of the current open repair actions or in a context of additionally contracted services.

The exemplary system 200 may include an HVAC repair confirmation and payment authorization unit 255. Such a unit 355 may be usable to communicate with an HVAC repair service provider regarding any results of the HVAC RCS evaluation of post-repair system performance and to authorize payment to the HVAC repair service provider only upon completion of a successful or satisfactory system-wide evaluation of post-repair operations for the HVAC system, and particularly whether the difficulty in the HVAC system for which the services of the HVAC repair service provider were engaged has been corrected.

All of the various components of the exemplary system 200, as depicted in FIG. 2, may be connected internally, and potentially to a remote processing or data storage device by one or more data/control busses 260. These data/control busses 260 may provide wired or wireless communication between the various components of the exemplary system 200, whether all of those components are housed integrally in, or are otherwise external and connected to, other components of an image forming system with which the exemplary system 300 may be associated.

It should be appreciated that, although depicted in FIG. 2 as an essentially integral unit, the various disclosed elements of the exemplary system 200 may be arranged in any combination of sub-systems as individual components or combinations of components, integral to a single unit, or external to, and in wired or wireless communication with, the single unit of the exemplary system 200. In other words, no specific configuration as an integral unit or as a support unit is to be implied by the depiction in FIG. 2. Further, although depicted as individual units for ease of understanding of the details provided in this disclosure regarding the exemplary system 200, it should be understood that the described functions of any of the individually-depicted components may be undertaken, for example, by one or more processors 215 connected to, and in communication with, one or more data storage device(s) 220, all of which may support operations in the associated HVAC system, or the HVAC RCS.

Figure 3:
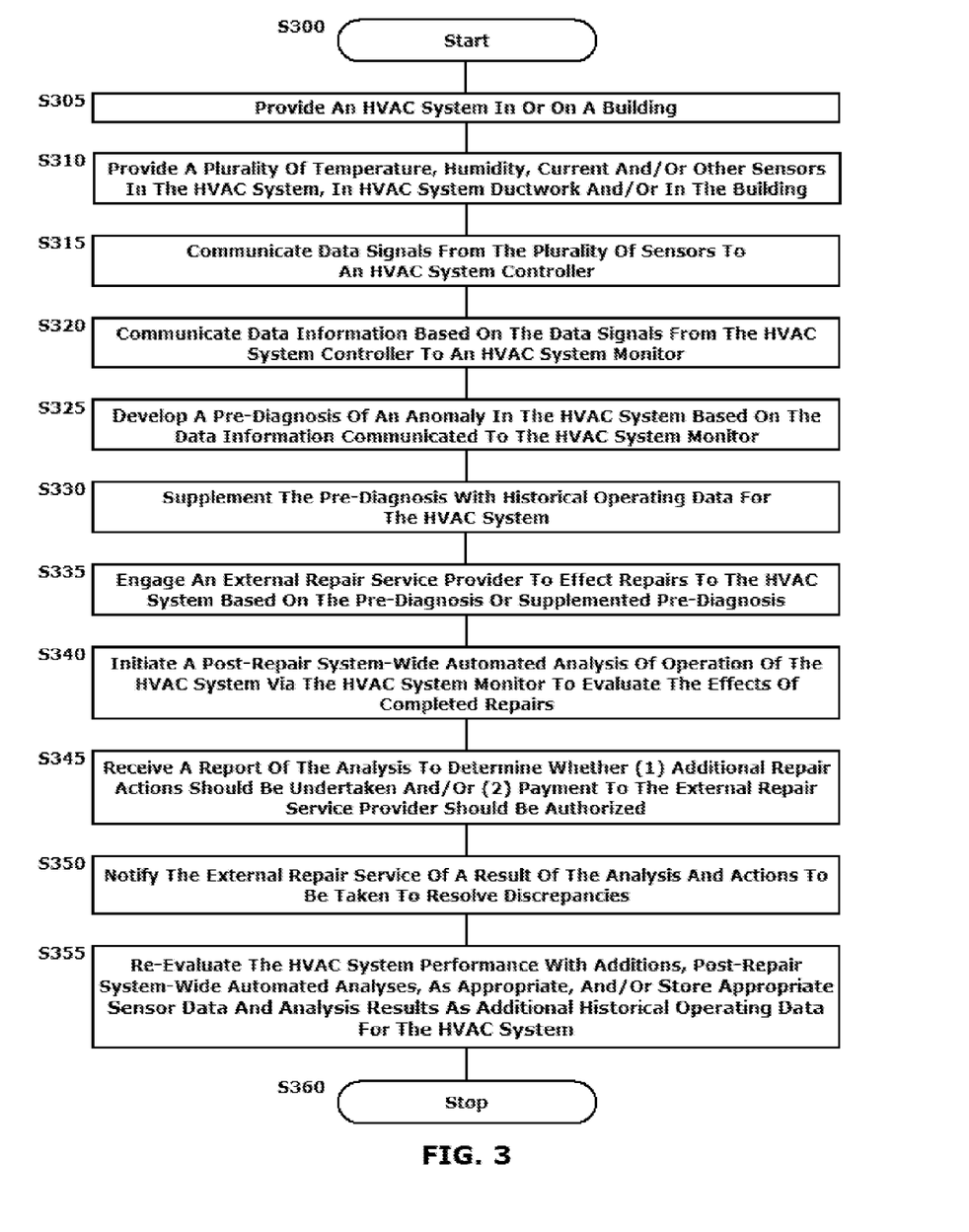
FIG. 3 illustrates a flowchart of an exemplary method for evaluating an efficacy of an HVAC system repair in the building based on a real-time analysis and a comparison to a system pre-diagnosis and any historical data on system operation according to this disclosure.

The disclosed embodiments may include an exemplary method for evaluating an efficacy of an HVAC system repair in the building based on a real-time analysis and a comparison to a system pre-diagnosis and any historical data on system operation. FIG. 3 illustrates a flowchart of such an exemplary method. As shown in FIG. 3, operation of the method commences at Step S300 and proceeds to Step S305.

In Step S305, an HVAC system may be provided in or on a building for adjusting environmental conditions within the building. Operation of the method proceeds to Step S310.

In Step S310, a plurality of temperature, humidity, current and/or other sensors may be provided in the provided HVAC system, in the HVAC system ductwork and in the involved building. Operation of the method proceeds to Step S315.

In Step 315, data signals may be communicated from the plurality of sensors to an HVAC system controller. Operation of the method proceeds to Step S320.

In Step S320, data information based on the data signals may be communicated from the HVAC system controller to an HVAC system monitor. The HVAC system monitor may be located within the monitored space associated with the HVAC system, or may otherwise be remote from and in data communication with the HVAC system. The communicated data signals, and thus the communicated data information, may be based on sensed temperature, humidity, current and other parameters. Operation of the method proceeds to Step S325.

In Step S325, a pre-diagnosis may be developed regarding the HVAC system based on the data information communicated to the HVAC system monitor that highlights one or more difficulties in the operation of the HVAC system. Operation of the method proceeds to Step S330.

In Step S330, the pre-diagnosis may be supplemented with historical operating data for the HVAC system in order to provide a broader, more detailed data set by which to define a particular difficulty experienced by the HVAC system. Operation of the method proceeds to Step S335.

In Step S335, an external repair service provider may be engage to effect repairs to the HVAC system based on the pre-diagnosis or the supplemented pre-diagnosis. Operation of the method proceeds to Step S340.

In Step S340, upon notification, automated or manual, of the completion of repair services by the engaged external repair service provider a post-repair system-wide automated analysis may be initiated by the HVAC system monitor to assess the completion of the repairs by evaluating the effects of the repairs against a set of standards for measured parameters, and/or against the system pre-diagnosis. Operation of the method proceeds to Step S345.

In Step S345, a report on a result of the analysis may be received by a building owner or operator, or other user, to determine whether the repair services are adequate in addressing the particular difficulty with the HVAC system, or whether, for example, additional work is required. The report on the result of the analysis may also provide a basis for a determination as to whether the external repair service provider should be paid for the services rendered. Those of skill in the art will recognize that it is an objective of the disclosed schemes to streamline a review and confirmation process according to a quantitative, rather than qualitative, set of assessment criteria that may be standardly applied across the HVAC industry to reduce a number of billing disputes and to decrease the time it takes a customer to pay the invoice, based on perceptions as to the operational effectiveness of a particular set of repair actions. Operation of the method proceeds to Step S350.

In Step S350, a result of the analysis and/or a generated report may be communicated to the external repair service provider to advise the provider as to any actions or billing issues that may have arisen as a result of the post-repair analysis. Operation of the method proceeds to Step S355.

In Step S355, HVAC system performance may be re-evaluated, in an iterative process if required, to determine whether remedial actions have successfully addressed ongoing or introduced difficulties in the HVAC system performance. All applicable system performance and system analytic data may be stored as updated historical data for the monitored HVAC system. Operation of the method proceeds to Step S360, where operation of the method ceases.

The above-described exemplary systems and methods reference certain conventional components to provide a brief, general description of suitable environmental condition control means for clarity and ease of understanding. Those skilled in the art will appreciate that other embodiments of the disclosed subject matter may be practiced with many types and configurations of individual devices and combinations of devices particularly common to HVAC and/or climate control systems of varying complexity. No limitation to the variety or configuration of individual component devices included in the environmental condition control systems is to be inferred from the above description.

The exemplary depicted sequences of executable instructions represent only examples of corresponding sequences of acts for implementing the functions described in the steps. The exemplary depicted steps in the above-described methods may be executed in any reasonable order to carry into effect the objectives of the disclosed embodiments. No particular order to the disclosed steps of the method is necessarily implied by the depiction in FIG. 3, and the accompanying description, except where a particular method step is a necessary precondition to execution of any other method step. Individual method steps may be carried out in sequence or in parallel in simultaneous or near simultaneous timing, as appropriate.

Although the above description may contain specific details, they should not be construed as limiting the claims in any way. Other configurations of the described embodiments of the disclosed systems and methods are part of the scope of this disclosure. For example, the above-described sensing and processing functions may be carried out by any form of sensor typically adapted for use in recovering temperature, humidity and power consumption values. The described control and processing functions may be carried out using hardware circuits, software instructions, or firmware, as well as with combinations thereof.

It will be appreciated that a variety of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A servicing confirmation system, comprising:
   a climate control monitoring device that communicates with a plurality of sensors positioned to sense environmental parameters of at least one of a climate control system, climate control ducting and a building supported by the climate control system;
   a data storage device;
   an analysis device that is configured to
      receive data from the climate control monitoring device;
      store first data in the data storage device, the first data being associated with a pre-servicing operating condition of the climate control system;
      analyze second data to determine a post-servicing operating status of the climate control system;
      compare a result of the analysis to at least one of (1) the stored first data and (2) a set of specified operating conditions for the climate control system;
      generate an alert to a user based on the analysis, the alert indicating to the user at least one of (1) an ineffectiveness of the servicing and (2) a recommendation not to pay a provider of the servicing; and
      generate an output of the analysis and comparison as an evaluation report regarding system servicing; and
   an output device that displays the evaluation report to the user.

2. The service confirmation system of claim 1, further comprising a user interface by which the user enters further actions to be taken in view of the evaluation report.

3. The service confirmation system of claim 1, the analysis device being further configured to
   calculate a pre-servicing efficiency parameter for the climate control system based on the first data;
   calculate a post-servicing efficiency parameter for the climate control system based on the second data;
   compare the pre-servicing efficiency parameter and the post-servicing efficiency parameter; and
   generate an output of the calculation and comparison as the evaluation report regarding system servicing.

4. The service confirmation system of claim 3, the analysis device being further configured to calculate an efficiency parameter for the climate control system by
   determining a rate of electrical consumption of the climate control system as energy into the climate control system;
   determining a change in temperature between return air recovered from the structure and supply air provided to the structure after being conditioned by the climate control system as energy out of the climate control system; and
   expressing the efficiency of the climate control system as a ratio of the energy into the climate control system and the energy out of the climate control system.

5. The service confirmation system of claim 1, the analysis device being further configured to reference stored additional historical operating data for the climate control system in the comparing the result of the analysis to the stored first data.

6. The service confirmation system of claim 1, the analysis device being further configured to generate a list of additional servicing requirements based on the analysis and comparison.

7. A method for confirming servicing, comprising:
   monitoring a plurality of sensors positioned to sense environmental parameters of at least one of a climate control system, climate control ducting and a building supported by the climate control system with a climate control monitoring device;
   receiving, with an analyzing device, data from the climate control monitoring device;
   storing first data in a data storage device, the first data being a portion of the data received from the climate control monitoring device associated with a pre-servicing operating condition of the climate control system;
   analyzing, with the analyzing device, second data to determine a post-servicing operating condition of the climate control system;
   comparing, with the analyzing device, a result of the analysis to at least one of (1) the stored first data and (2) a set of specified operating conditions for the climate control system;
   generating, with the analyzing device, an alert to a user based on the analysis, the alert indicating to the user at least one of (1) an ineffectiveness of the servicing and (2) a recommendation not to pay a provider of the servicing;
   generating, with the analyzing device, an output of the analysis and comparison as an evaluation report regarding system servicing; and
   displaying the evaluation report to the user.

8. The method of claim 7, further comprising receiving, with the analyzing device, a user input regarding further actions to be taken in view of the evaluation report.

9. The method of claim 7, further comprising:
   calculating, with the analyzing device, a pre-servicing efficiency parameter for the climate control system based on the first data;
   calculating, with the analyzing device, a post-servicing efficiency parameter for the climate control system based on the second data;
   comparing, with the analyzing device, the pre-servicing efficiency parameter and the post-servicing efficiency parameter; and
   generating, with the analyzing device, an output of the calculation and comparison as the evaluation report regarding system servicing.

10. The method of claim 9, the analyzing device calculating an efficiency parameter for the climate control system by
    determining a rate of electrical consumption of the climate control system as energy into the climate control system;
    determining a change in temperature between return air recovered from the structure and supply air provided to the structure after being conditioned by the climate control system as energy out of the climate control system; and
    expressing the efficiency of the climate control system as a ratio of the energy into the climate control system and the energy out of the climate control system.

11. The method of claim 7, the analyzing device referencing stored additional historical operating data for the climate control system in the comparing the result of the analysis to the stored first data.

12. The method of claim 7, the analyzing device generating a list of additional servicing requirements based on the analysis and comparison.

13. A non-transitory data storage medium storing instructions that, when executed by a processor, cause the processor to execute steps of a method for confirming servicing, the method comprising:
- monitoring a plurality of sensors positioned to sense environmental parameters of at least one of a climate control system, climate control ducting and a building supported by the climate control system; receiving data from the climate control monitoring device;
- storing first data in a data storage device, the first data being a portion of the data associated with a pre-servicing operating condition of the climate control system;
- analyzing second data to determine a post-servicing operating condition of the climate control system;
- comparing a result of the analysis to at least one of (1) the stored first data and (2) a set of specified operating conditions for the climate control system;
- generating an alert to a user based on the analysis, the alert indicating to the user at least one of (1) an ineffectiveness of the servicing and (2) a recommendation not to pay a provider of the servicing;
- generating an output of the analysis and comparison as an evaluation report regarding system servicing; and
- displaying the evaluation report to the user.

14. The non-transitory data storage medium of claim 13, the method further comprising:
- calculating a pre-servicing efficiency parameter for the climate control system based on the first data;
- calculating a post-servicing efficiency parameter for the climate control system based on the second data; comparing the pre-servicing efficiency parameter and the post-servicing efficiency parameter; and
- generating an output of the calculation and comparison as the evaluation report regarding system servicing.

15. The non-transitory data storage medium of claim 14, the calculating an efficiency parameter for the climate control system comprising
- determining a rate of electrical consumption of the climate control system as energy into the climate control system;
- determining a change in temperature between return air recovered from the structure and supply air provided to the structure after being conditioned by the climate control system as energy out of the climate control system; and
- expressing the efficiency of the climate control system as a ratio of the energy into the climate control system and the energy out of the climate control system.

* * * * *